(12) United States Patent
Ye et al.

(10) Patent No.: US 10,225,319 B2
(45) Date of Patent: Mar. 5, 2019

(54) SYSTEM AND METHOD OF A LINK SURFED HTTP LIVE STREAMING BROADCASTING SYSTEM

(71) Applicant: TELEFONAKTIEBOLAGET LM ERICSSON (PUBL), Stockholm (SE)

(72) Inventors: Nancy Ye, Shanghai (CN); Lily Liang, Shanghai (CN); Jinyang Xie, Shanghai (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 246 days.

(21) Appl. No.: 15/026,102

(22) PCT Filed: Sep. 30, 2013

(86) PCT No.: PCT/CN2013/084734
§ 371 (c)(1),
(2) Date: Mar. 30, 2016

(87) PCT Pub. No.: WO2015/042962
PCT Pub. Date: Apr. 2, 2015

(65) Prior Publication Data
US 2016/0219094 A1    Jul. 28, 2016

(51) Int. Cl.
H04N 7/10       (2006.01)
H04N 7/025      (2006.01)
(Continued)

(52) U.S. Cl.
CPC .......... *H04L 67/02* (2013.01); *H04L 65/4084* (2013.01); *H04L 65/602* (2013.01); *H04L 65/608* (2013.01)

(58) Field of Classification Search
CPC ....... H04N 21/23439; H04N 21/64322; H04N 21/647; H04N 21/4331; H04L 65/4084; H04L 67/02
See application file for complete search history.

(56) References Cited

U.S. PATENT DOCUMENTS 9,462,024 B2 * 10/2016 Wang .................. H04L 65/4076
2002/0010783 A1   1/2002 Primak et al.
(Continued)

FOREIGN PATENT DOCUMENTS

CN    1843013 A    10/2006
CN    101997822 A    3/2011
CN    102638731 A    8/2012

OTHER PUBLICATIONS

International Search Report and Written Opinion for International Patent Application No. PCT/CN2013/084734, dated May 21, 2014, 11 pages.

*Primary Examiner* — Jason P Salce
(74) *Attorney, Agent, or Firm* — Rothwell, Figg, Ernst & Manbeck, p.c.

(57) ABSTRACT

A method is described that is executed by a computer system implementing a hypertext transfer protocol (HTTP) to enable serving media files by streaming over HTTP. The method is constructed to enable serving media files that are segmented from multiple sources using switch access points defined in a switch access point (SAP) file. The SAP files define transition points in the serving of the media files between different media file sources. The method includes a set of steps such as determining a media meta file or media segment files for a SAP file. The requested media meta file or media segment files are sent to the client. A request for a SAP file is then received from the client. The SAP file request is redirected to a second HTTP server in response to the SAP file indicating the next media segment file identified by the SAP file is not local.

10 Claims, 8 Drawing Sheets

(51) Int. Cl.
*H04L 29/08* (2006.01)
*H04L 29/06* (2006.01)

(56) References Cited

U.S. PATENT DOCUMENTS

| | | | |
|---|---|---|---|
| 2002/0112096 A1* | 8/2002 | Kaminsky | G06F 17/30887 |
| | | | 719/330 |
| 2011/0283308 A1* | 11/2011 | Huo | H04L 43/16 |
| | | | 725/14 |
| 2012/0090013 A1* | 4/2012 | Zhou | H04L 47/801 |
| | | | 725/95 |
| 2013/0091251 A1* | 4/2013 | Walker | H04N 21/6125 |
| | | | 709/219 |
| 2015/0200992 A1* | 7/2015 | Houdaille | H04L 65/80 |
| | | | 709/219 |

* cited by examiner

SYSTEM AND METHOD OF A LINK SURFED HTTP LIVE STREAMING BROADCASTING SYSTEM

CROSS REFERENCE TO RELATED APPLICATIONS

This application is a 35 U.S.C. § 371 National Phase Entry Application from PCT/CN2013/084734, filed Sep. 30, 2013, designating the United States, the disclosure of which is incorporated by reference.

FIELD OF THE INVENTION

The embodiments of the invention relate to a method and apparatus for a live streaming audio-video media. Specifically, the embodiments relate to a method and apparatus for live streaming audio-video media having multiple sources that supports transition between live streaming audio-video sources.

BACKGROUND

In current video and file delivery solutions, hyper-text transfer protocol (HTTP) Live Streaming (HLS) technology has been widely adopted. APPLE HLS (by APPLE, Inc. of Cupertino, Calif.) and motion picture experts group (MPEG) dynamic adaptive streaming over HTTP (DASH) are two of the standards popular in this area.

These technologies and other technologies have been used in social networking sites and similar Internet sites for sharing video files and streams. In particular there is a growing interest in sharing live video streams that may cover a live event, events of personal interest, or online activities. These video streams are constrained to using a single camera or video source. Combining multiple video sources requires editing video files to splice or similarly combine them.

Alternatively, more expensive and complicated broadcasting technology must be utilized, such as the technologies used by professional television broadcasts. This technology requires expensive specialty video editing work stations and a team of video editors to queue and time the playback of multiple video sources for a single television broadcast.

SUMMARY

A method is described that is executed by a computer system implementing a hypertext transfer protocol (HTTP) to enable serving media files by streaming over HTTP. The method is constructed to enable serving media files that are segmented from multiple sources using switch access points defined in a switch access point (SAP) file. The SAP files define transition points in the serving of the media files between different media file sources. The method includes a set of steps such as receiving a request for an SAP file from a client. The method continues by determining a media meta file or media segment files for the requested SAP file. The requested media meta file or media segment files are sent to the client. A request for a SAP file is then received from the client. The SAP file is parsed to determine a next media meta file. A check is made whether the next media meta file is local to the computer system. The SAP file request is redirected to a second HTTP server in response to the SAP file indicating the next media segment file identified by the SAP file is not local.

A computer system is disclosed for implementing a hypertext transfer protocol (HTTP) to enable serving media files by streaming over HTTP. The computer system is configured to further enable serving media files that are segmented from multiple sources using switch access points defined in a switch access point (SAP) file. The SAP file is used to define transition points in the serving of the media files between different media file sources. The computer system comprises a network interface configured to send and transmit data, the network interface is further configured to receive a request for an SAP file from a client. The computer system also includes a processing device that is coupled to the network interface. The processing device is configured to determine a media meta file or media segment files for the requested SAP file, to send the media meta file or media segment files to the client, to receive a request for the SAP file from the client, to parse the SAP file to determine a next media meta file, to check whether the next media meta file is local to the computer system, and to redirect the SAP file request to a second HTTP server in response to the SAP file indicating the next media segment file identified by the SAP file is not local.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

The operations of the flow diagrams will be described with reference to the exemplary embodiment of the figures. However, it should be understood that the operations of the flow diagrams can be performed by embodiments of the invention other than those discussed with reference to the figures, and the embodiments discussed with reference to the figures can perform operations different than those discussed with reference to the flow diagrams of the figures. Some of the figures provide example topologies and scenarios that illustrate the implementation of the principles and structures of the other figures.

The techniques shown in the figures can be implemented using code and data stored and executed on one or more electronic devices (e.g., an end station, a network element, etc.). Such electronic devices store and communicate (internally and/or with other electronic devices over a network) code and data using non-transitory machine-readable or computer-readable media, such as non-transitory machine-readable or computer-readable storage media (e.g., magnetic disks; optical disks; random access memory; read only memory; flash memory devices; and phase-change memory). In addition, such electronic devices typically include a set of one or more processors coupled to one or more other components, such as one or more storage devices, user input/output devices (e.g., a keyboard, a touch screen, and/or a display), and network connections. The coupling of the set of processors and other components is typically through one or more busses and bridges (also termed as bus controllers). The storage devices represent one or more non-transitory machine-readable or computer-readable storage media and non-transitory machine-readable or computer-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is a piece of networking equipment, including hardware and software, that communicatively interconnects other equipment on the network (e.g., other network elements, end stations, etc.). Some network elements are "multiple services network elements" that provide support for multiple networking functions (e.g., routing, bridging, switching, Layer 2 aggregation, session border control, multicasting, and/or subscriber management), and/or provide support for multiple application services (e.g., data, voice, and video). Subscriber end stations (e.g., servers, workstations, laptops, palm tops, mobile phones, smart phones, multimedia phones, Voice Over Internet Protocol (VOIP) phones, portable media players, GPS units, gaming systems, set-top boxes (STBs), etc.) access content/services provided over the Internet and/or content/services provided on virtual private networks (VPNs) overlaid on the Internet. The content and/or services are typically provided by one or more end stations (e.g., server end stations) belonging to a service or content provider or end stations participating in a peer to peer service, and may include public web pages (free content, store fronts, search services, etc.), private web pages (e.g., username/password accessed web pages providing email services, etc.), corporate networks over VPNs, IPTV, etc. Typically, subscriber end stations are coupled (e.g., through customer premise equipment coupled to an access network (wired or wirelessly) to edge network elements, which are coupled (e.g., through one or more core network elements to other edge network elements) to other end stations (e.g., server end stations).

Live Broadcasting Overview

There are several use cases of particular interest for a live broadcasting system: (1) Live dynamic ad insertion during live broadcasting; and (2) Live social audio-video broadcasting in a distributed environment, for example, some new devices like wearable glasses will make user level live video sharing more commonplace. For these use cases, there are some special requirements for the live broadcasting control model. Compared to the widely adopted play list control model, which will have some pre-arranged media sequence and pre-communicated content length with timestamps and time durations, these kinds of user cases will require some dynamic and distributed control model to accommodate the dynamic nature of these video streams and the style of broadcast over the Internet.

Taking Ad Insertion as an example, the control model must accommodate dynamic (i.e., unforeseeable) nature of the live broadcast. Ad markup is typically done at the encoding stage. For static ad insertion, ad break locations are known ahead of time. This is the typical case for video-on-demand (VoD) or similar pre-recorded media content. For content viewed in real-time (e.g., broadcast events at the "live edge"), ad break locations and durations are only known several seconds ahead of time (e.g., as little as a few seconds in advance). The latter case is referred to as dynamic ad insertion.

Ad decisions are typically made in real time. In case of VoD or pre-recorded content, an ad break can be either taken or skipped, and the break duration may differ. In the case of "live edge" broadcasts, the ad break can be taken at any time and it can have a variable duration. An ad break can be a sequence of several ads. The composition of an ad break in both static and dynamic case is typically known only in real time. Available ad representations can differ greatly from those for the main content in characteristics such as bitrates, resolutions, interlacing, segment duration, codecs, and similar characteristics. It should be noted that these significant differences are undesirable, because the overall quality of the broadcast is diminished when the ads have inferior characteristics to the main content. Ads are typically unencrypted, even when the content itself is DRM-protected.

To accommodate real-time control of a live broadcast, a media presentation description (MPD) or M3U8 metadata file update is expected or some event notification expected. These metadata files are utilized to define the structure and timing of video content in a live broadcast. The MPD metadata file is utilized by MPEG DASH. MPEG DASH is an adaptive bitrate streaming technology where an audio-video file is partitioned into one or more segments and delivered to a client using HTTP. The MPD describes segment information (i.e., timing, a uniform resource locator, bit rate, video resolution and similar video stream properties). Multiple versions of the audio-video stream at different resolutions or bit rates can be available, and selection can be made based on network conditions, device capabilities and user preferences, thereby enabling adaptive bitrate streaming. A streaming client can request the MPD file at a pre-defined update frequency. Alternatively, an event message "emsg" can be utilized to trigger an MPD update. An emsg is a message type defined for MPEDG DASH signaling between the HTTP server and client device. If an audio-video stream is altered then these processes can be used to get the updated MPD file that will include the information about the changes to the video stream. However, the embodiments described herein below obviate the need for these mechanisms for updating an MPD file.

While the embodiments and examples described herein above and below may be described in relation to MPEG DASH or in some instances HLS (which has a similar implementation using M3U8 metadata files in place of the MPDs), these example embodiments are provided by way of example and not limitation. One skilled in the art would understand that the principles and structures described herein are also applicable to other similar technologies.

The disadvantages of the prior art include various limitations on the ability of the MPEG DASH, HLS and similar technologies to support dynamic redirection of audio-video sources. For live broadcast and VoD content, the MPD and media segment file representation will be expected to be different, which limits the streaming usage case in the distribution domain as a consequence. The biggest advantage for HTTP live streaming is that VoD, live streaming and Internet file-based traffic can be handled in a similar way, which can make implementation cost efficient. While this provides some benefits for HTTP Live streaming, it is just in the distribution side, thus high costs remain in content generation, production and consumption.

Because of these costs video live broadcasting is primarily a professional game, or if it is personalized broadcasting like Internet Protocol (IP) camera sharing, it is a more static experience without much concatenation of multiple video sources, splicing of multiple video source or switching actions between video sources. MPD and media segment files are expected to be modified on the fly, which brings more complexity into the system. There are no existing technologies that can address these issues in an easy and cost effective way. MPD updates suffer from time interval accuracy problems and bring additional overhead for servicing update requests. The unpredictable nature of this problem makes defining a method to solve it difficult, especially for independent user, social style live broadcasting.

The use of an "emsg" introduces some complexity to media segment modification and also requires the implementation of special logic which is not present in live streaming and VoD systems. Thus, the embodiments do no rely on the use of emsgs. Although a playlist style control model can still be applied at a high level, a more flexible control system is needed to accommodate the dynamic, distributed and personalized VoD and live streaming mixture environment for individualize video sharing such as social video stream sharing.

Using this system media segments, MPD files, an HTTP live streaming server and client can have as uniformed behaviour as possible, which in a typical user case such as social video stream sharing will encompass some mixture of live event/VoD/time shift and similar content in a single video stream. Moreover, MPD files and media segments need to be as close to the original sources quality as possible, no change in the intermediate processing and no differentiation for type, such as live event/VoD/Time cases.

Considering the large overhead for media storage and media network distribution, it is preferred that the least amount of media copy operations be performed between different servers as possible. In this context, the control model covers concatenation, splicing and switching, which are supposed to be the general methods in these use cases. Some audio-video content editing will still require some kinds of content modification and transcoding, which is out of the current scope of the present invention. In the individual live broadcasting environment, such as social network sharing, most of the use cases will not require content modification, and it is not expected that such editing will be employed.

As used herein, audio and video synchronization is referring to the existing technology within a media segment. In some embodiments, there will be some program clock reference (PCR) discontinuity flag or codec change during the distribution, and the client will be the one to handle these cases. Time based alignment, audio silent in/out, video shot length control around the switching point, loudness control around the switching point, time accuracy, audio/video synchronization are not discussed in detail, but one skilled in the art would understand that these technologies can be applied to the embodiments herein in combination with the live broadcasting system.

These disadvantages of the prior art can be overcome by the embodiments of the present invention. The embodiments of the invention provide a method and system that introduce a uniform resource locator (URL) rewriting/redirection function in MPEG DASH, HLS or similar system to mark streaming video concatenating, splicing, or switching points. As used herein, the Switch Access Point (SAP) file is utilized to describe the file that defines these points. URL rewriting/redirection is managed on the server side and the delivery to clients will be uniform for live broadcast streams, VoD and time shift cases.

On the client side, instead of requesting an MPD update periodically or waiting for an "emsg" event, the client will request a SAP file instead. The SAP file will be mapped to media segment files using a regular expression rule, the SAP file describes the time sequence between media segment files and SAP files. For most of the use cases, the media segment files and SAP files will share the same numbering/sequencing strategy or format.

On the server side, when a switch between video sources is determined, a SAP file will be generated or updated with the same numbering strategy or sequencing format as the associated media segments. The target audio-video source for a switch will be an MPD file that will be identified using the URL redirection function on the server side, and this URL forwarding will be expected to be executed on the server side. Hence the SAP file redirection will be transparent to client.

On the server side, a URL rewriting process is in place that implements the required logic. This logic can include checking whether the SAP file exists for a given media segment time span, then the process follows this SAP file to the next MPD or media segment file. However, if the SAP file does not exist, then the next media segment file is sent for the video stream. In one embodiment, the URL rewriting will be performed by a local server, and the SAP URL redirection can be referring to a remote server.

Figure 1:
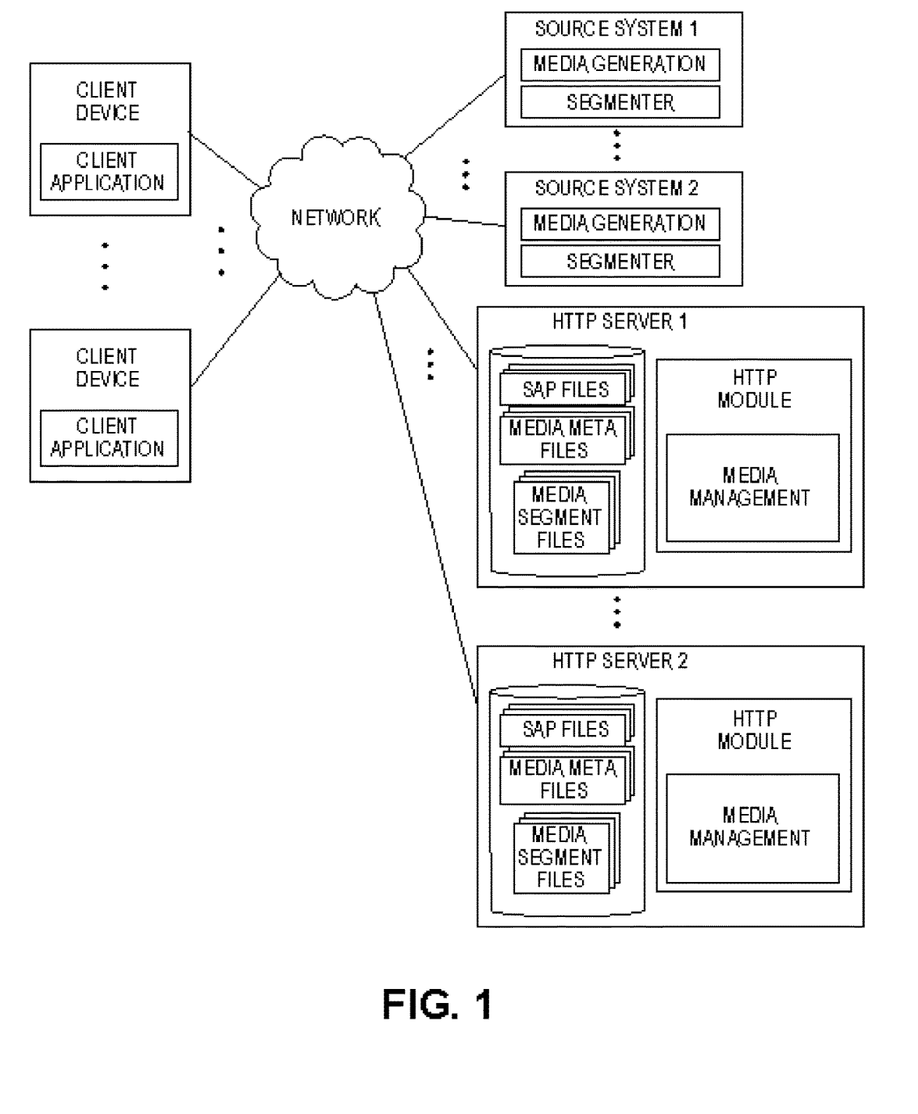
FIG. 1 is a diagram of one embodiment of an architecture in which the live video streaming supporting multiple sources can be implemented.

FIG. 1 is a diagram of one embodiment of an architecture in which the live video streaming supporting multiple sources can be implemented. The architecture includes a set of client devices 101 that are consumers of the live video streams that are served by a set of HTTP servers 113. A 'set,' as used herein, refers to any positive whole number of items including one item. The architecture also includes a set of media source systems 107 that generate the video streams that are served by the HTTP servers 113.

The client devices 101 can be any type of end user computing devices such as personal computers, handheld devices (e.g., smartphones, tablets and similar devices), console devices and similar computing devices. The architecture can support any number of client devices 101 of any combination of types and capacities. Each client device 101 can execute a client application 103 that consumes the live video streams from the HTTP servers 113. The client applications can be any type of general purpose video player or specialized video player applications including extensions to browsers or other applications. These applications are capable of supporting either MPEG DASH, HLS or similar technologies as modified to support switching points and SAP files.

The network 111 can be any type or combination of network types including local area networks and wide area networks. The network 111 can encompass cellular networks, wireless networks and similar technologies that enable the client devices 101 to communicate with the HTTP servers 113. For example, client devices 101 that are handheld devices such as smartphones can connect to a cellular communication service as an Internet Service Provider and reach the HTTP servers 113 over the Internet.

The HTTP servers 113 can be any type or set of computing devices capable of executing an HTTP module 115 and media management 123 to serve video streams to the client devices 101 over the network 111. The HTTP servers 113 can be dedicated server machines, workstations, personal computers or similar computing devices. The HTTP servers 113 can perform their operations and functions independently or in a distributed process. In one embodiment, the HTTP servers 113 include data storage systems that store SAP files 117, media meta files 117 (e.g., MPD files) and media segment files 121 associated with the video streams that are hosted and served by the HTTP module 115.

The HTTP module 115 receives requests from clients for video streams and services these requests in combination with the media management 123 component. The media management 123 component manages the media segments for each video stream along with the media data files 119 and SAP files 117. The media management 123 component updates these files as it receives additional media segments or switch information from source systems 107 or other sources that can affect the control model of the video streams. The media management 123 component manages SAP files and performs the URL rewrite process as described further herein below. The architecture can support any number of HTTP servers 113 that broadcast any number of live streams to the set of client devices 101.

The architecture can also include a set of source systems 105 that provide content for the live broadcast video streams. These source systems 105 include a media generation 107 component and a segmenter 109 component. The media generation 107 component can be any type of device or application that can generate audio or video content such as a camera or similar recording device. The segmenter 109 is software or hardware that encodes the generated media using any encoding standard (e.g., MPEG 4 or similar standards). The source system 109 can provide the segmented media to the HTTP servers 113 and can also generate notices of switches that are utilized by the media management 123 component to update SAP files and perform the URL rewrite.

Figure 2:
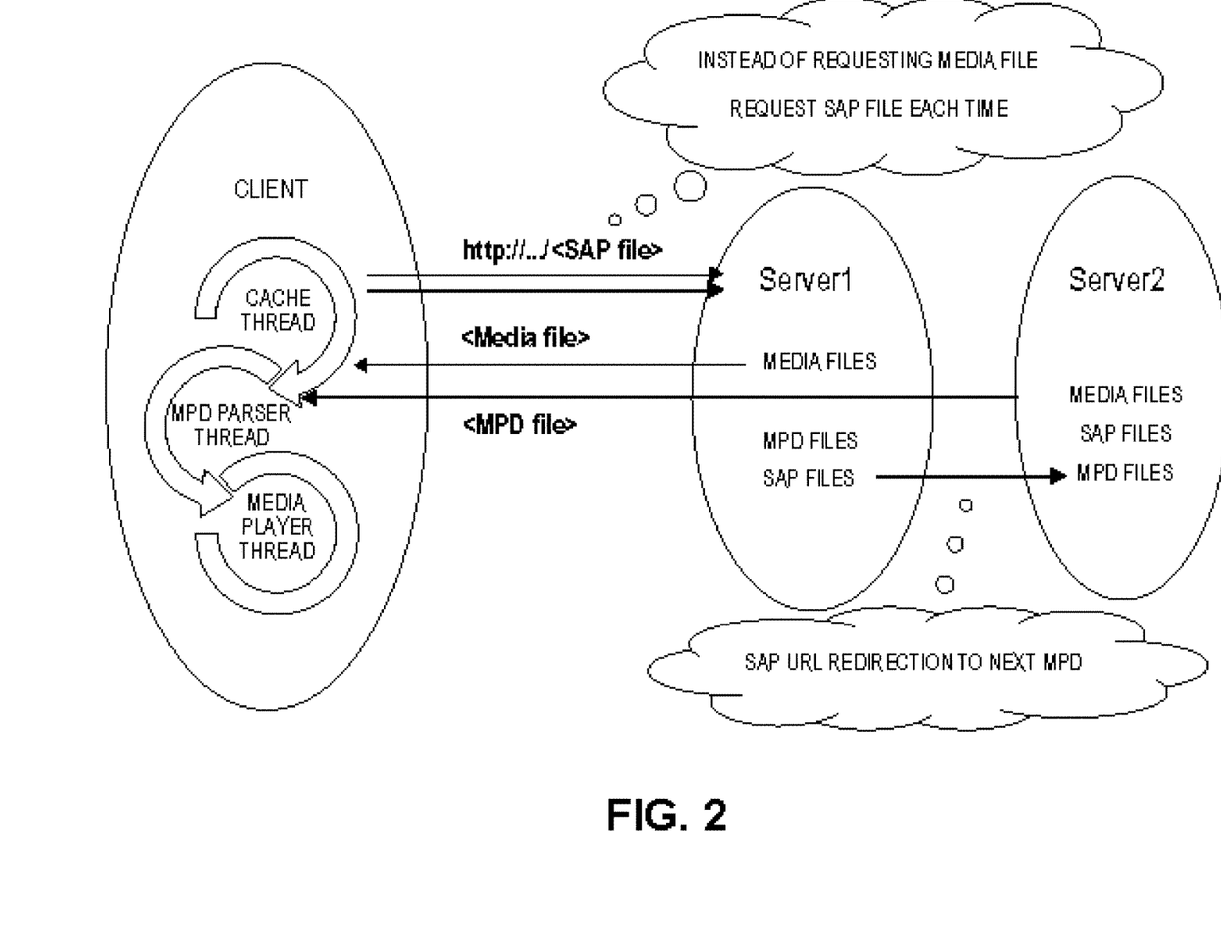
FIG. 2 is a diagram of one embodiment of the URL redirection process.

FIG. 2 is a diagram of one embodiment of the URL redirection process. As discussed above, on the server side, SAP files have been introduced into MPEG DASH or HLS systems to indicate streaming concatenating, splicing or switching points, which can be referred to generically as switching points. The SAP file will use URL rewriting/redirection to direct the retrieval of the next media segment or next media metadata file (e.g., an MPD file). The figure illustrates the basic client server model that supports the use of the SAP file to identify switching points for jumping between HTTP servers for a given video stream.

An SAP file is aligned with media meta file (i.e., the media segments and media meta files for a given video stream), sharing the same numbering strategy or sequencing format. A client that supports DASH/HLS requests an SAP file at an input URL at given intervals to obtain a video stream. Receiving the request for the SAP file will trigger server logic to provide the SAP file, MPD file and initiate the streaming of the associated media segments. The MPD file shall introduce URL rewriting definition for SAP to media segments rewrite pattern. URL rewriting rules can further be extended to use scripts. Live broadcasting, time shift and VoD issues can be solved with an unified architecture across the client, server and network, which provide an easy to use and efficient solution using URL rewriting/redirection.

In the client a cache thread can be executed that requests the SAP file at a given URL and passes on the received SAP file and MPD files to a MPD parsing thread. The MPD parsing thread can identify the specific media segments in the video stream as specified by the MPD file. Each media segment receives is passed onto the media player thread for playback. When a switch point is reached, as specified by the SAP file, a request for the MPD file is sent to the original HTTP server with the original URL, which rewrites/redirects the URL to the HTTP server with the MPD file of the next video source of the video stream.

Figure 3:
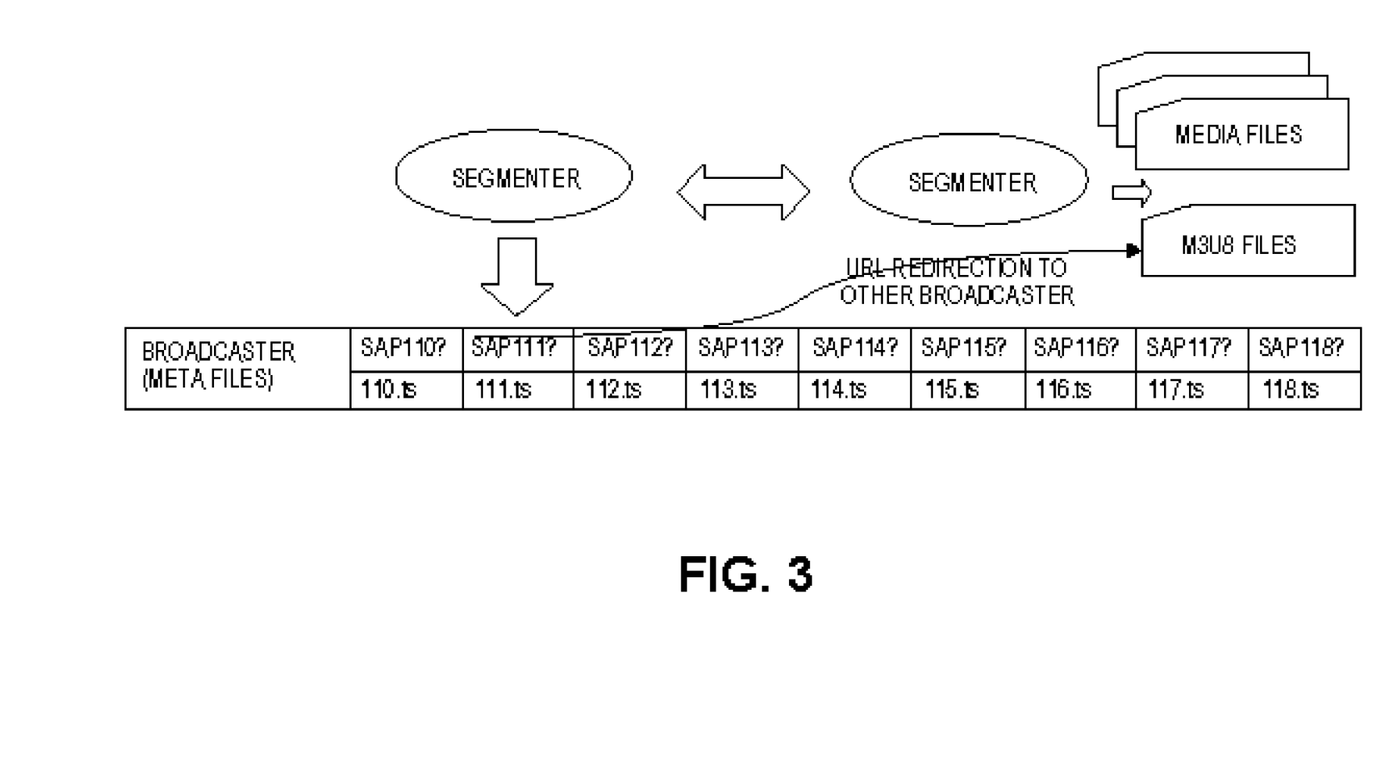
FIG. 3 is a diagram of an example meta data format identifying the switching points for a live video stream.

FIG. 3 is a diagram of an example meta data format identifying the switching points for a live video stream. In the diagram, the SAPxxx? tags indicate the switch Access points, which are associated with specific time stamps or similar sequencing information. An SAP file is a file that contains the necessary information for an HTTP server to perform URL redirection. The process for identifying and notifying the HTTP server of a particular switch point, type or pattern can be centralized or distributed. With the meta data form each media segment file will have one SAP file mapping if the SAP file exists. Each time when a client requests media content, the client is requesting the SAP file (at a particular URL), if the SAP file does not exist, media content is returned based on URL rewriting rules. Example pseudocode for this rewriting can be expressed as:

```
If (SAP file exist for this media segment time span) {
    Follow SAP file to next MPD or media segment file
    Return MPD file or media segment file
                                                    } else {
    Return original media segment file
                                                    }
```

Thus, in the illustrated meta data format, each field is a possible juncture and corresponding time span at which a switch can occur. The segmenter breaks down the media content into media segments that match each time period. The client sends a request at each juncture (e.g., at each time stamp) to request the SAP file (if it exists) to get the next media segment specified by the SAP file and MPD file, where the next meta data file is at another HTTP server, a URL rewrite occurs to another HTTP server which provides the next meta data file (e.g., as illustrated an M3U8 file for HLS).

Figure 4:
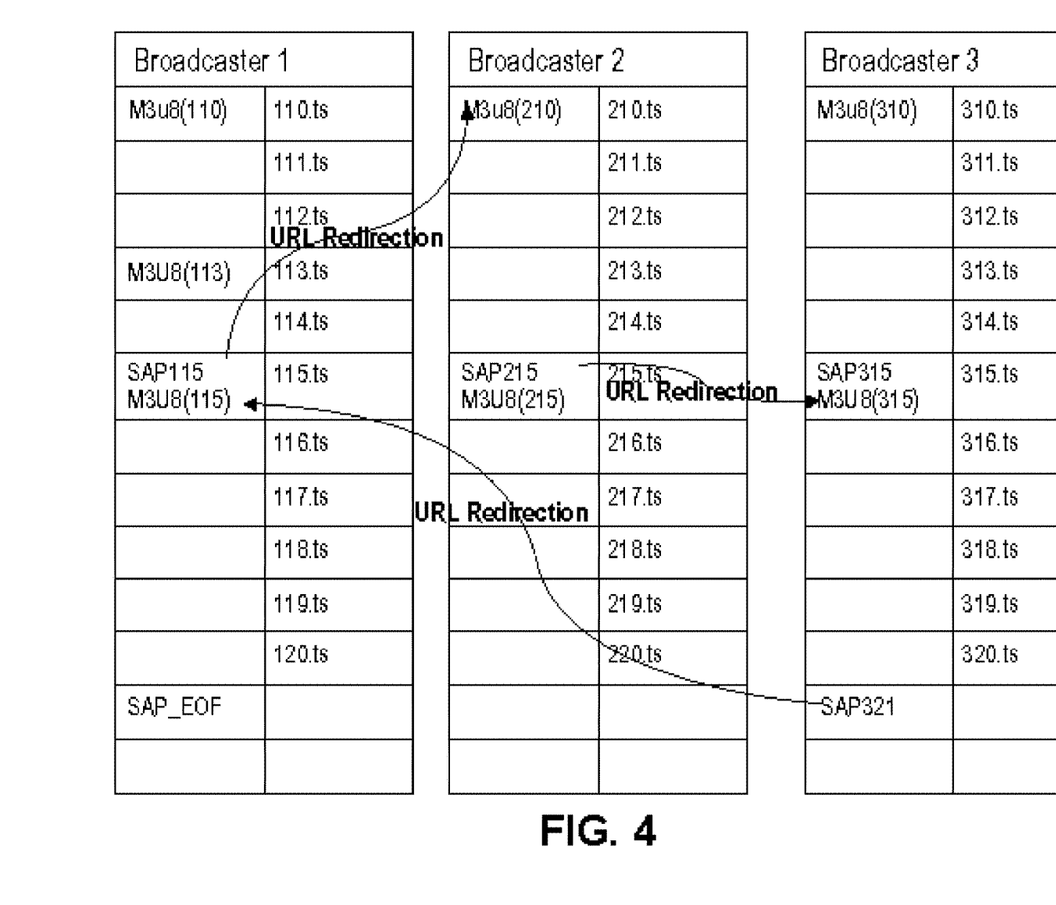
FIG. 4 is a further example demonstrating the URL rewrite/redirection process and the associated format that enables the URL redirection and rewriting.

FIG. 4 is a further example demonstrating the URL rewrite/redirection process and the associated format that enables the URL redirection and rewriting. This example shows how an SAP jump can happen between different servers and the corresponding server link and client receive sequence is provided.

Client Side File Sequence:

M3u8(110)→110.ts→111.ts→112.ts
M3u8(113)→113.ts→114.ts
M3u8(210)→210.ts→211.ts→212.ts→213.ts→214.ts
M3u8(315)
→315.ts→316.ts→317.ts→318.ts→319.ts→320.ts
M3u8(115)
→115.ts→116.ts→117.ts→118.ts→119.ts→120.ts

This sequence using HLS shows the meta data and SAP file entries in the left hand column for a particular HTTP server. The second column designates the time stamp or similar identifier for a media segment that is identified and sent for a particular meta data file entry. Thus, where an SAP file and meta data file (M3U8(110) (e.g., here an M3U8 file in an HLS implementation system) starts at timestamp 110.ts and continues in sequence to 112.ts. At this point, the client request provides M3U8(113), which corresponds to media segments 113.ts and 114.ts. At SAP115 and corresponding M3U8(115) a switch is implemented via a URL rewrite of the incoming request from the client, which redirects the client to a second HTTP server (Broadcaster 2), which provides M3U8(210) covering 210.ts through 214.ts before a further rewrite/redirection occurs. The process continues until the redirection returns to the original HTTP server at the same point that it departed. This sequence is exactly the same for all live video streaming, VoD, or time shift video distribution models. So the client is expected to have the same buffer model for different distribution cases and hence it is easy to adapt to different models, especially in a social event where the end user may switch easily between live steaming, VoD, or time shift cases.

Figure 5:
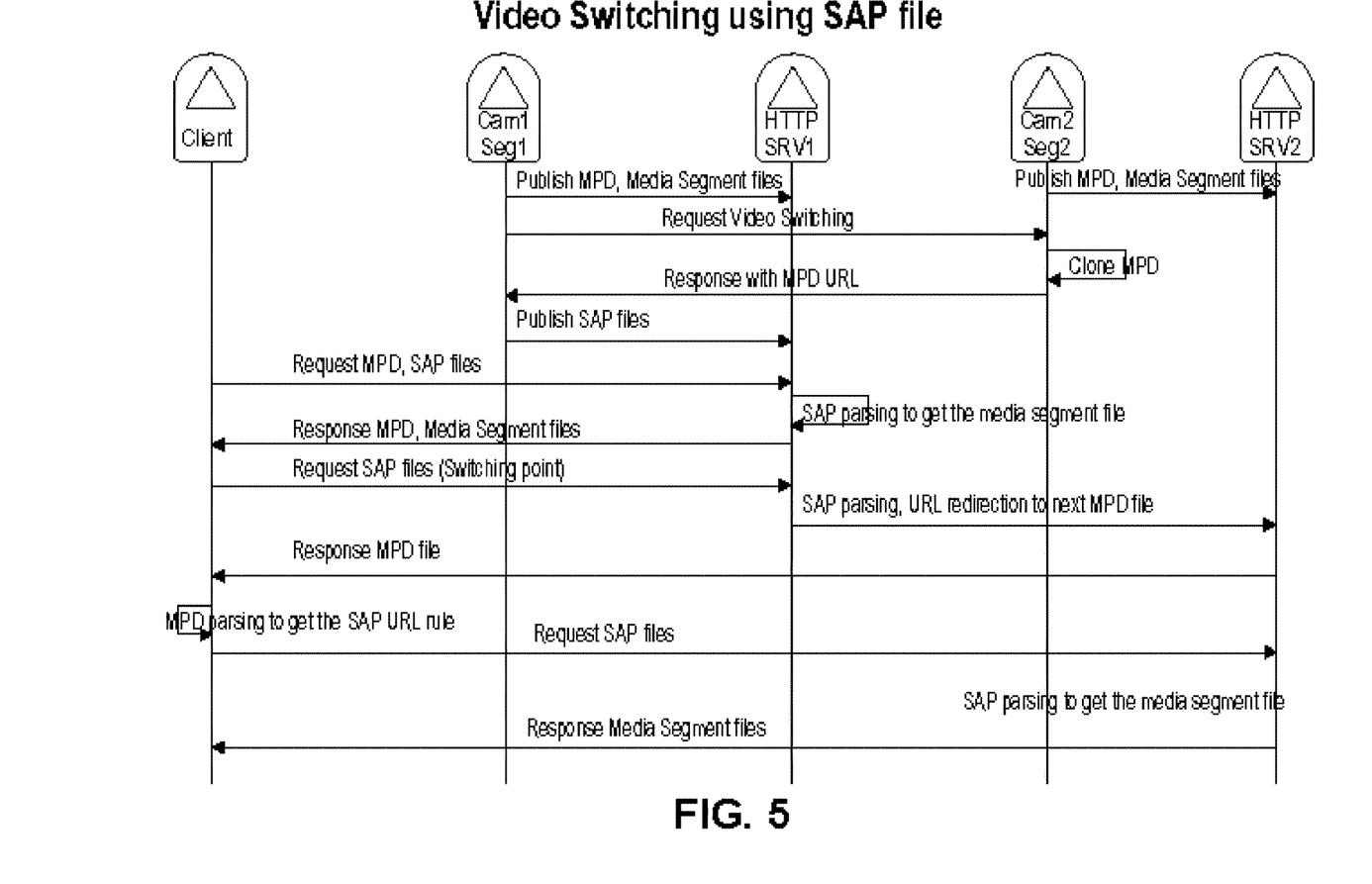
FIG. 5 is a diagram of the timing of the control model for the URL rewrite and redirection process.

FIG. 5 is a diagram of the timing of the control model for the URL rewrite and redirection process. The diagram is a timing diagram showing that the process can be initiated by media generating sources such as the cam1/seg1 or cam2/seg2 (i.e., camera 1 and 2 combined with media segmenters 1 and 2, respectively). The media generating sources publish (i.e., upload or transfer) MPD and media segment files for a video stream to respective HTTP servers. A media generator or other source can then request a video stream source switch to a second media generator. The second media generator creates a local MPD that is a clone of the original from the first media generating server and responds to the switching request with a URL for the cloned MPD file. With this information, the first media generator can publish the SAP file for the video stream that defines the switch to the second media generating source via the supplied URL, which belongs to a MPD (or similar meta data file) to be hosted by the second HTTP server.

A client can request a live video stream (including a VoD or time shifted content as well) via a URL that functions as a request for an SAP file and MPD file for the live video stream. The first server receives the request, examines or parses the identified SAP file to determine the associated MPD and media segment files. The MPD files and media segment files are then sent to the client. The client continues to request the SAP file at defined intervals as the media segments are played back or similarly processed by the client. When a switching point is reached, the request for the SAP file in the form of a URL is rewritten and thereby redirected to the second HTTP server providing the MPD file, which is then parsed to get the SAP rule that is utilized to request the SAP file at a URL associated with the second HTTP server.

When the second HTTP server receives the request for an SAP file from the client application, it parses the SAP file to identify the appropriate media segment files that are then returned to the client. This process can continue indefinitely through any number of switches and any number of media generators and HTTP servers. The switches can return the process to the original HTTP server or indefinitely redirect the live video streaming to another HTTP server providing media content for the live video stream. Thus, an infrastructure and process with low cost and high efficiency is provided that can allow end users to easily provide live streaming from multiple media generation sources.

Figure 6:
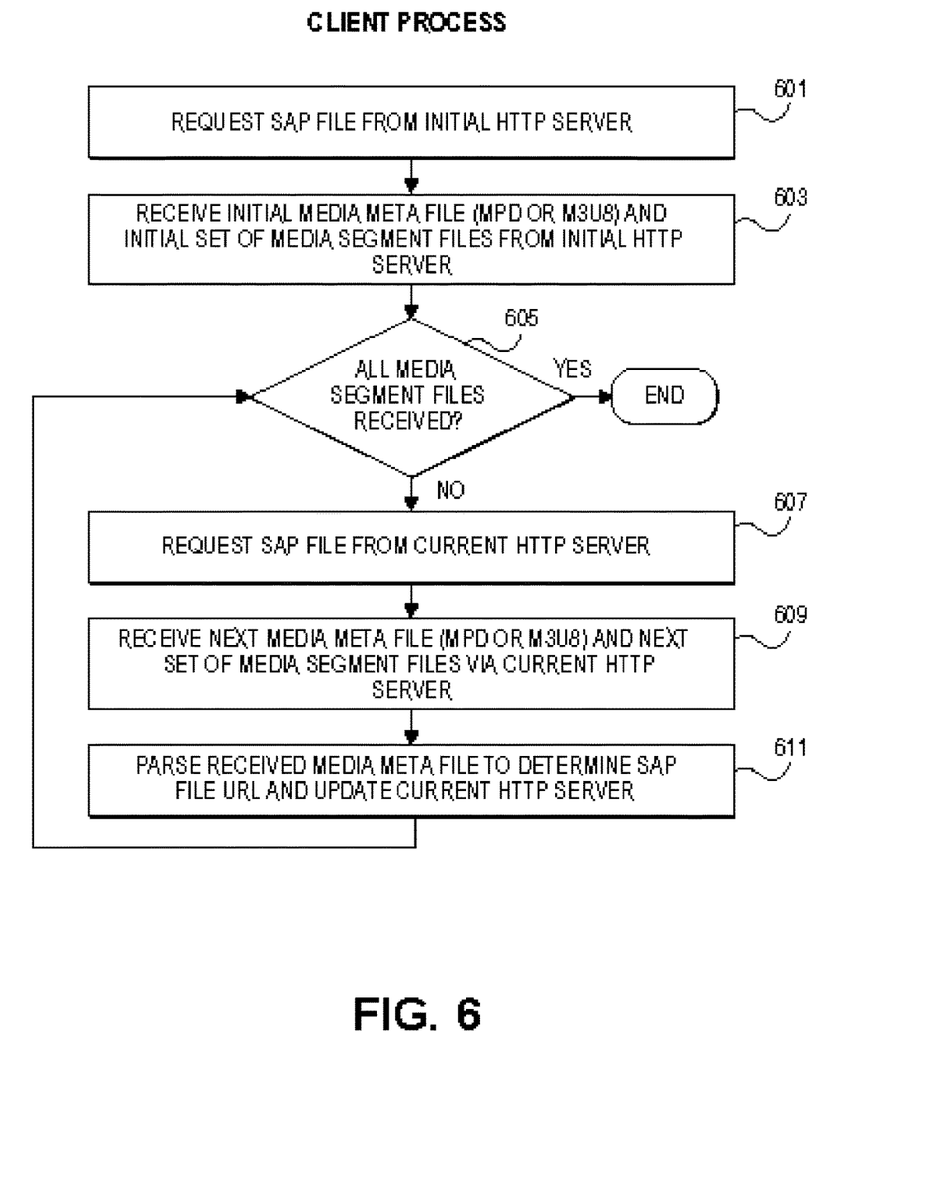
FIG. 6 is a flowchart of one embodiment of the URL rewriting and redirection as executed by a client application.

FIG. 6 is a flowchart of one embodiment of the URL rewriting and redirection as executed by a client application. In one embodiment, the client process starts with a user initiated request to access a live video stream, which the client enacts by requesting an SAP file using an input URL from the initial HTTP server (Block 601). The client application then receives an initial media meta data file (e.g., an MPD or M3U8) from the HTTP server (Block 603). The client application also receives an initial set of media segment files identified by the MPD from the HTTP server. The meta data file is reviewed to check whether all media segments have been received, in other words whether the video stream has been terminated (Block 605). If the video stream has been terminated, then the process can end.

If the video stream has not been terminated, then the client requests the SAP file again from the HTTP server (Block 607). This request can be generated when the identified set of media segments has been received or in advance of receiving a last media segment identified by the received meta data file. The next media meta file is then received along with a next set of media segment files from the current HTTP server (Block 609). This next set of media segment files can be empty if the received MPD file is a redirection to another HTTP server and includes a URL for the MPD on the new HTTP server. The MPD is parsed to determine whether the current HTTP server must be updated due to redirection and URL rewriting by the HTTP server indicating a switch to another media generation source. (Block 611). The current HTTP server is updated accordingly and the process continues where the live stream is not terminated (Block 605).

Figure 7:
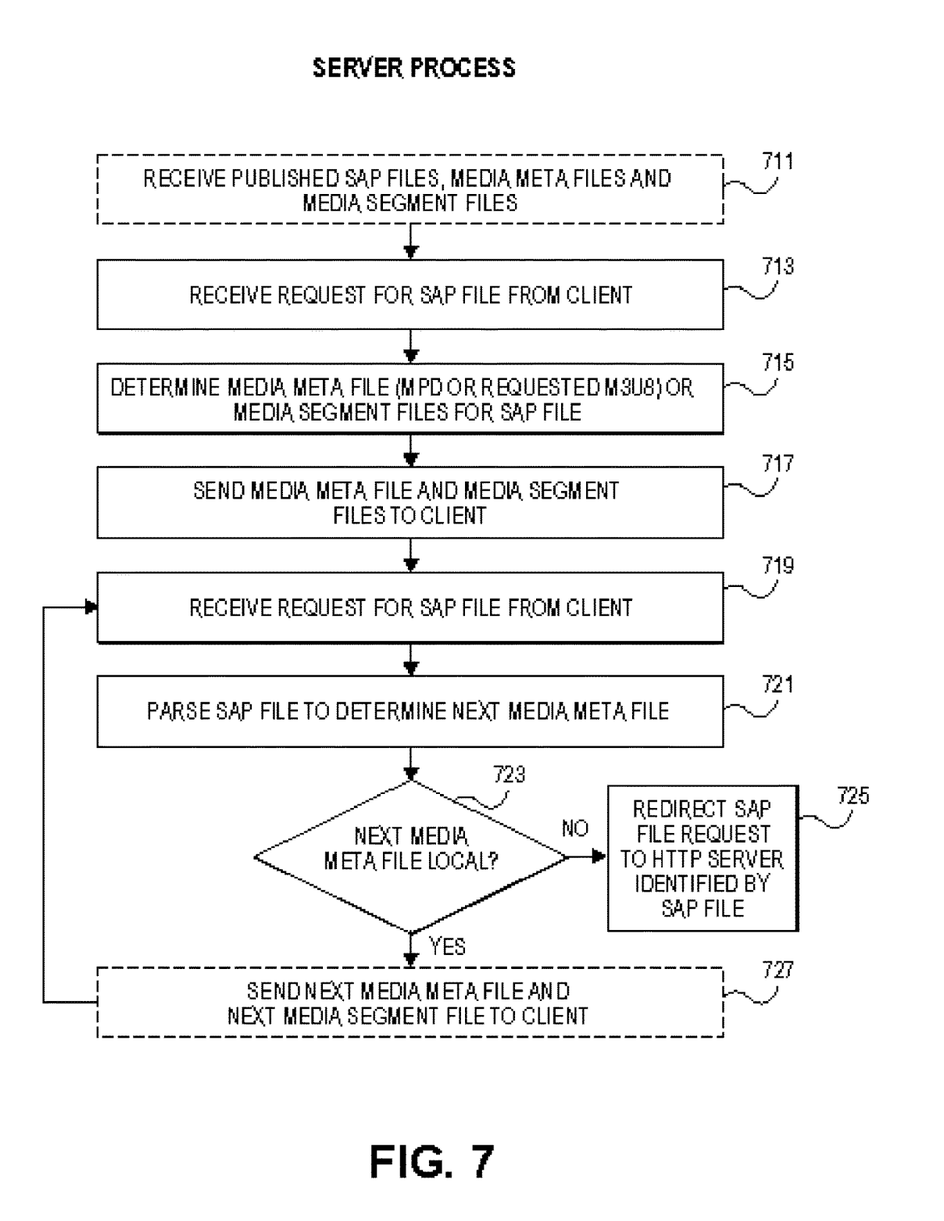
FIG. 7 is a flowchart of one embodiment of the URL rewriting and redirection as executed by an HTTP server.

FIG. 7 is a flowchart of one embodiment of the URL rewriting and redirection as executed by an HTTP server. The process can be initiated when a media generator publishes SAP files, media meta files and media segment files to the HTTP server (Block 711). Any number of media generators can publish (i.e., upload) live video streams to the HTTP server, for sake of clarity, an example with a single live video stream and single client is described, however, one skilled in the art would understand that the process is applicable to any number of video streams and any number of clients and media generators.

The HTTP server subsequently receives a request with a URL for a SAP file that is tied to a particular live video stream from a client application (Block 713). The URL is utilized to determine the SAP file, which is parsed to determine an initial media meta file (e.g., an MPD or M3U8) as well as the media segment files associated with the URL and specified SAP file (Block 715). The media meta file and media segment files that are specified by the media meta file are then returned to the client application (Block 717). In some embodiments, the SAP file itself is also returned.

A subsequent request can then be received from the client application including the URL of the SAP file, which indicates that an update of the SAP file is requested to obtain the next meta data file and the associated media segments (Block 719). The identified SAP file is analyzed or parsed to determine the next media meta data file (Block 721). A check is made whether the media meta file is local to the HTTP server (Block 723).

If the media meta file is located at the HTTP server, then the process continues to send the media meta file and associated media segment files to the client (Block 727). The updated or current SAP file can also be returned to the client application. The process then continues when a further request for the SAP file is received (Block 719). The process can end where a video stream terminates or a client ends its viewing of the video stream and no further requests are received from a client.

The SAP file an also indicate that a switching point (e.g., as part of a concatenation, splicing, or other switching operation) has occurred that changes the media generation source to another media generator hosted by another HTTP server. In this case, the received URL is rewritten to a URL of an SAP file hosted by another HTTP server, which can be returned to the client application or the request forwarded to the second HTTP server (Block 725). The video streaming is then serviced by this second HTTP service and the process ends for the current HTTP service. The switching could subsequently return the handing of the video stream to the current HTTP service, in which case the process continues when the request for an SAP file is again received (Block 719).

Figure 8A:
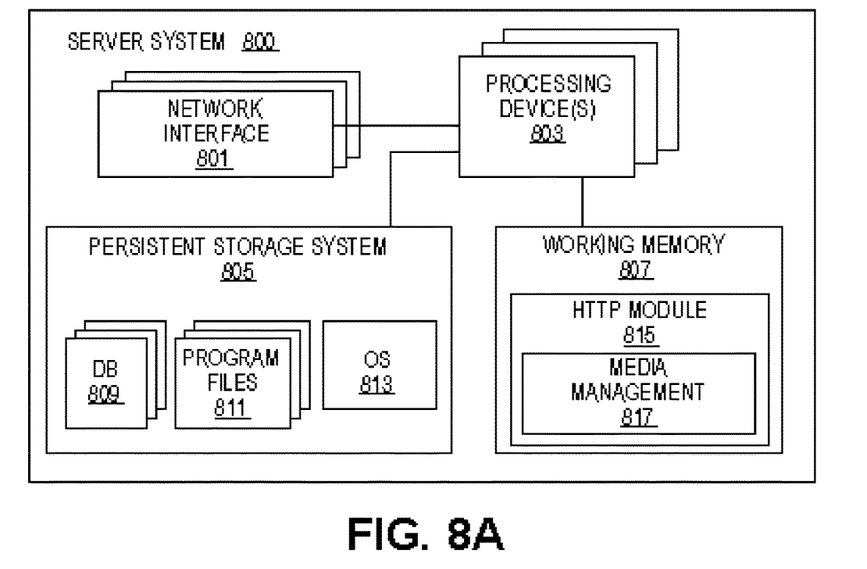
FIG. 8A is a diagram of one embodiment of a server system.

FIG. 8A is a diagram of one embodiment of a server system. The illustrated server system is provided by way of example and not limitation. Those skilled in the art would understand that other configurations can implement the processes described herein and that these processes could be distributed over multiple devices.

In one embodiment, the server system 800 includes a set of network interfaces 801, a set of processing devices 803, a persistent storage system 805 and a working memory 807. The network interfaces 801 enable communication of data and the exchange of information between the server system 800 and a set of client systems as well as a set of media generators. The network interfaces 801 can provide wired or wireless connections to any number or type of networks.

The processing devices 803 can be general purpose processing devices such as central processing units (CPUs), application specific integrated circuits (ASICs) or similar devices that execute the processes of the server system. The processes can be code or circuitry, including code stored in the persistent storage system 805 or the working memory 807. The working memory 807 can store the HTTP module 815 and the media management 817 component that provide the URL rewrite and redirection functions and related functions that enable the processes described herein above. The HTTP module 815 and media management 817 component can be software that is loaded and executed by the processing devices 803 and can be also stored in the persistent storage system 805.

The persistent storage system 805 can include additional programs and data that is utilized by or that supports the HTTP module 815 and the media management 817) component. This additional software can include an operating system 813 and other program files 811. A set of databases 809 can also be stored in a persistent storage system 805 that stores the SAP files, MPD files, media segment files and similar data from media generators that is serviced by the HTTP module 815. In other embodiments, this data is stored or cached in the working memory 807.

Figure 8B:
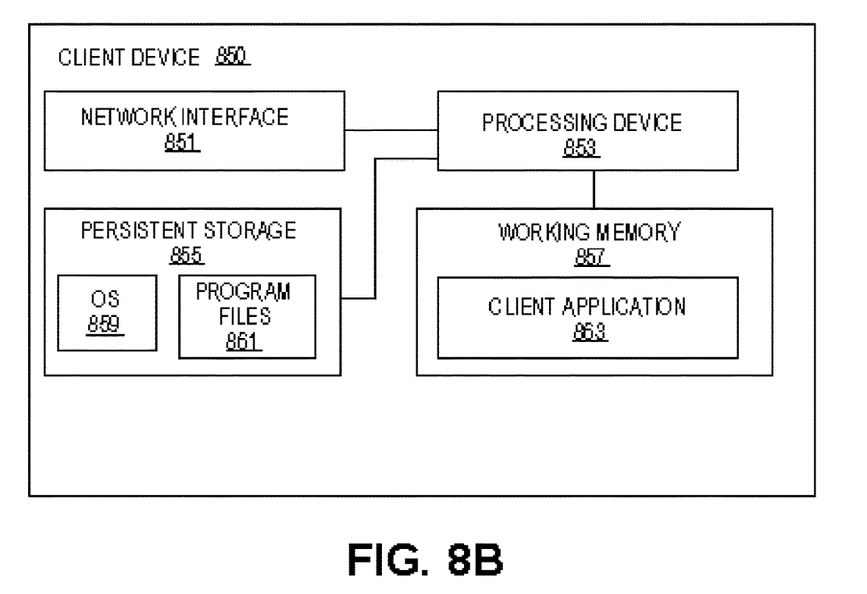
FIG. 8B is a diagram of one embodiment of a client device.

FIG. 8B is a diagram of one embodiment of a client device. The illustrated server system is provided by way of example and not limitation. Those skilled in the art would understand that other configurations can implement the processes described herein and that these processes could be distributed over multiple devices.

In one embodiment, the client device 850 includes a set of network interfaces 851, a set of processing devices 853, a persistent storage system 855 and a working memory 857. The network interfaces 851 enable communication of data and the exchange of information between the server system the client system 850. The network interfaces 851 can provide wired or wireless connections to any number or type of networks.

The processing devices 853 can be general purpose processing devices such as central processing units (CPUs), application specific integrated circuits (ASICs) or similar devices that execute the processes of the server system. The processes can be code or circuitry, including code stored in the persistent storage system 855 or the working memory 857. The working memory 857 can store the client application 863 that provides video playback and accesses video streams from an HTTP server that implements the URL rewrite and redirection functions and related functions that enable the processes described herein above. The client application 863 can be software that is loaded and executed by the processing devices 853 and can be also stored in the persistent storage system 855.

The persistent storage system 855 can include additional programs and data that is utilized by or that supports the client application 863. This additional software can include an operating system 859 and other program files 861. A set of data structures can also be stored in a persistent storage system 855 that stores received SAP files, MPD files, media segment files and similar data from HTTP service that is to be processed by the client application 863. In other embodiments, this data is stored or cached in the working memory 857.

The embodiments of the invention provide various features and advantages. The process provides a simple unified solution for live streaming including VoD and time shift cases. The client application can have the same buffer model for different distribution cases and hence it is easy to adapt to different models, especially in a social video streaming event where end user may switch easily between live streaming sources including VoD and time shift. URL rewrite/redirection is compatible with existing technology, including content distribution networks (CDNs), software defined networks (SDN), peer to peer (P2P), and proactive network provider participation P2P (P4P) and can be transparent for these technologies. An SAP file can be a script platform, which can accommodate more complex way to share video in new ways, Thus, a method, system and apparatus for a process for media source switching using a URL rewrite and redirection for live video streaming has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method executed by a first hypertext transfer protocol (HTTP) server to enable serving media files by streaming over HTTP, the method to further enable serving media files that are segmented from multiple sources using switch access points defined in a switch access point (SAP) file to define transition points in the serving of the media files between different media file sources, the method comprising the steps of:

receiving a first request for a SAP file from a client;
determining a media meta file or media segment files for the requested SAP file;
sending the determined media meta file or media segment files to the client;
receiving a second request for the SAP file from the client;
parsing the SAP file to determine a next media meta file;
checking whether the next media meta file is local to the first HTTP server;
redirecting the SAP file request to a second HTTP server in response to the SAP file indicating the next media segment file identified by the SAP file is not local, wherein
redirecting the SAP file request to the second HTTP server comprises sending to the client a message comprising a Uniform Resource Locator (URL) comprising i) an identifier identifying the second HTTP server and ii) information for identifying a SAP file, wherein the message causes the client to send to the second HTTP server a request message comprising the information for identifying the SAP file, and
the method further comprises:
receiving a video switching request from a first content generation computer;
forwarding the video switching request to a second content generation computer;
receiving a response to the video switching request from the second content generation computer including a media meta file uniform resource locator; and
passing the media meta file uniform resource locator to the first content generation computer to be included in the SAP file.

2. The method of claim 1, further comprising the step of:
receiving a published SAP file, media meta files and media segment files at the first HTTP server from a first content generation computer.

3. The method of claim 1, further comprising the step of:
sending a next media file and next media segment file to the client, in response to the SAP file indicating the next media segment file identified by the SAP file is local.

4. The method of claim 2, wherein the received published SAP file includes the SAP file requested by the client.

5. The method of claim 1, wherein parsing the SAP file to determine the next media meta file, further comprises the step of:
identifying the next media segment files associated with the next media meta file.

6. A first a hypertext transfer protocol (HTTP) server to enable serving media files by streaming over HTTP, the first HTTP server to further enable serving media files that are segmented from multiple sources using switch access points defined in a switch access point (SAP) file to define transition points in the serving of the media files between different media file sources, the first HTTP server comprising:

a network interface configured to send and transmit data, the network interface further configured to receive a request for an SAP file from a client; and
a processing device coupled to the network interface, the processing device configured to determine a media meta file or media segment files for the requested SAP file, to send the media meta file or media segment files to the client, to receive a request for the SAP file from the client, to parse the SAP file to determine a next media meta file, to check whether the next media meta file is local to the first HTTP server, and to redirect the SAP file request to a second HTTP server in response to the SAP file indicating the next media segment file identified by the SAP file is not local, wherein
the processing device is configured to redirect the SAP file request to the second HTTP server by sending to the client a message comprising a Uniform Resource Locator (URL) comprising i) an identifier identifying the second HTTP server and ii) information for identifying a SAP file, wherein the message causes the client to send to the second HTTP server a request message comprising the information for identifying the SAP file,
the processing device is further configured to receive a video switching request from a first content generation computer, and to forward the video switching request to a second content generation computer, and
the processing device is further configured to receive a response to the video switching request from the second content generation computer including a media meta file uniform resource locator, and to pass the media meta file uniform resource locator to the first content generation computer to be included in the SAP file.

7. The first HTTP server of claim 6, wherein the network interface is further configured to receive published SAP files, media meta files and media segment files from a first content generation computer.

8. The first HTTP server of claim 6, wherein the process is further configured send a next media file and next media segment file to the client, in response to the SAP file indicating the next media segment file identified by the SAP file is local.

9. The first HTTP server of claim 7, wherein the received published SAP file includes the SAP file requested by the client.

10. The first HTTP server of claim 7, wherein the processor is further configured to identify the next media segment files associated with the next media meta file.

* * * * *